United States Patent [19]

Huang

[11] Patent Number: 5,596,776

[45] Date of Patent: Jan. 28, 1997

[54] COLLAPSIBLE SAFEGUARD RAIL STRUCTURE

[76] Inventor: Li-chu C. Huang, No. 9, Alley 2, Lane 606, Sec. 2, Po Ai Rd., Chia Yi City, Taiwan

[21] Appl. No.: 563,729

[22] Filed: Nov. 28, 1995

[51] Int. Cl.$^6$ ............................................. A47C 19/02
[52] U.S. Cl. ..................... 5/426; 5/425; 5/286; 5/282.1; 403/326; 403/263
[58] Field of Search ............................. 5/426, 425, 428, 5/430, 282.1, 285, 286; 403/326, 263, 230

[56] References Cited

U.S. PATENT DOCUMENTS

| | | | |
|---|---|---|---|
| 4,833,743 | 5/1989 | Howell et al. | 5/430 |
| 4,934,025 | 6/1990 | Mariol | 5/99.1 |
| 5,279,006 | 1/1994 | Teng | 5/99.1 |

Primary Examiner—Steven N. Meyers
Assistant Examiner—Fredrick Conley
Attorney, Agent, or Firm—Poms, Smith, Lande & Rose

[57] ABSTRACT

A rail structure includes two tubes each movably mounted on one of two bases and each having a catch mounted on an upper portion thereof. Two fasteners each have a lower portion detachably mounted on one of the two catches. Two supporting braces each have a first distal end attached to one of the two fasteners. A pivot bracket has two distal ends each pivotally engaged with a second distal end of one of the two supporting braces. L-shaped first and second resting rails each have a vertical section mounted on an upper portion of one of the two fasteners. A tubular block is mounted around one distal end of a horizontal section of the first resting rail and has a first transmission member rotatably mounted thereon. A second transmission member is rotatably mounted on one distal end of a horizontal section of the second resting rail and is pivotally engaged with the first transmission member.

6 Claims, 12 Drawing Sheets

COLLAPSIBLE SAFEGUARD RAIL STRUCTURE

FIELD OF THE INVENTION

The present invention relates to collapsible safeguard rail structure.

BACKGROUND OF THE INVENTION

A conventional safeguard rail structure is not easily operated and cannot be assembled and dismantled by users.

The present invention has arisen to mitigate and/or obviate disadvantages of the conventional rail structure.

SUMMARY OF THE INVENTION

The primary objective of the present invention is to provide a collapsible safeguard rail structure which is easily assembled and dismantled and will take up a small space when being in a folded and dismantled status.

In accordance with one aspect of the present invention, there is provided a rail structure comprising two L-shaped bases each having a horizontal section and a vertical section. There are two horizontal supports each having one distal end fixedly attached to the horizontal section of a corresponding one of the two bases. Two tubes are each movably mounted in the vertical section of a corresponding one of the two bases.

Two catches are each fixedly mounted on an upper portion of a corresponding one of the two tubes. Two fasteners are mounted each including a lower portion detachably mounted on a corresponding one of the two catches.

There are two supporting braces each having a first distal end fixedly attached to a horizontal portion of a corresponding one of the two fasteners and a second distal end. A pivot bracket includes two distal ends each pivotally engaged with the second distal end of a corresponding one of the two supporting braces.

L-shaped first and second resting rails are provided each including a vertical section fixedly mounted on an upper portion of a corresponding one of the two fasteners. A tubular block is fixedly mounted around one distal end of a horizontal section of the first resting rail.

A first transmission member is rotatably mounted on the tubular block. A second transmission member is rotatably mounted on one distal end of a horizontal section of the second resting rail and is pivotally engaged with the first transmission member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 1:
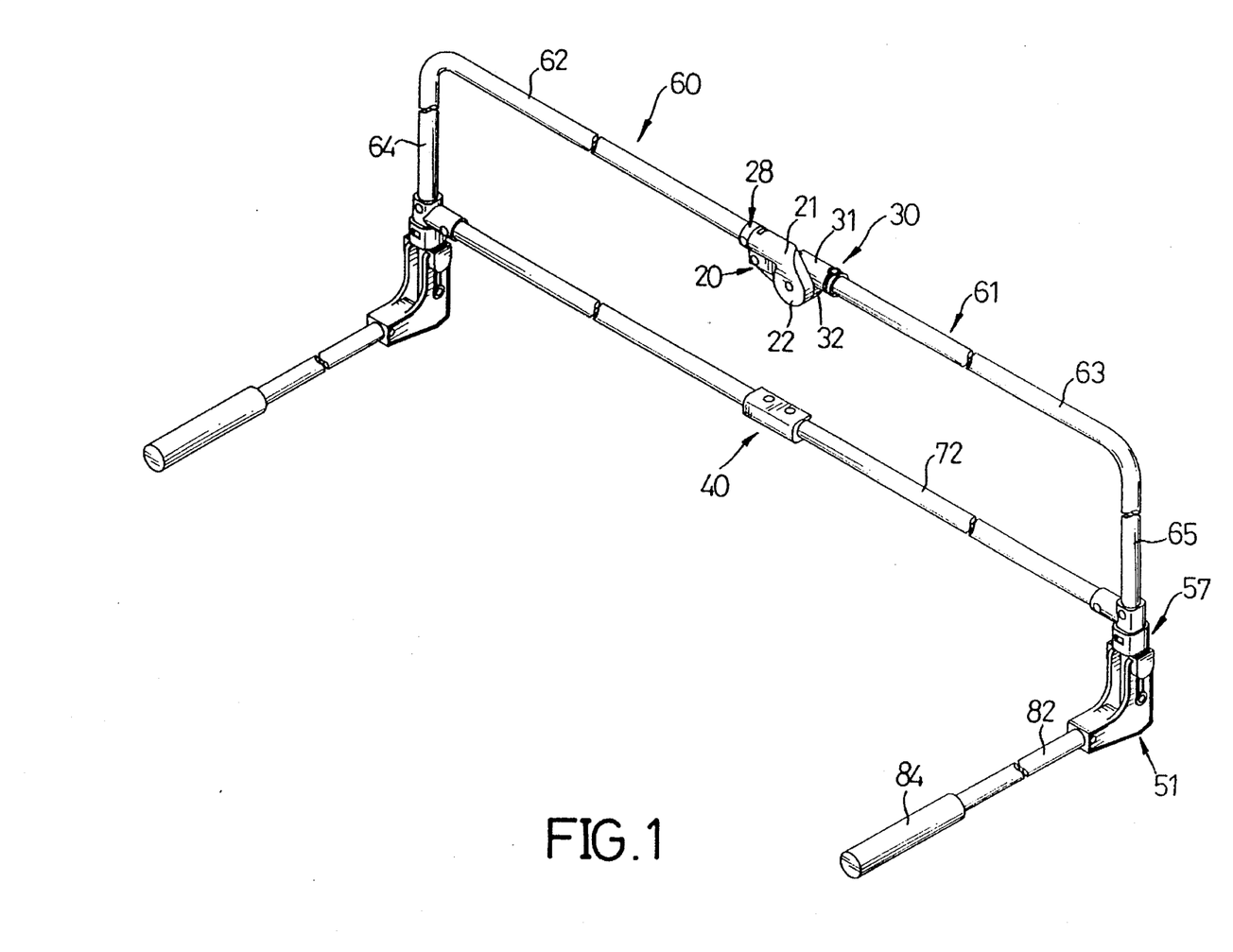
FIG. 1 is a perspective view of a safeguard rail structure in accordance with the present invention.
Figure 2:
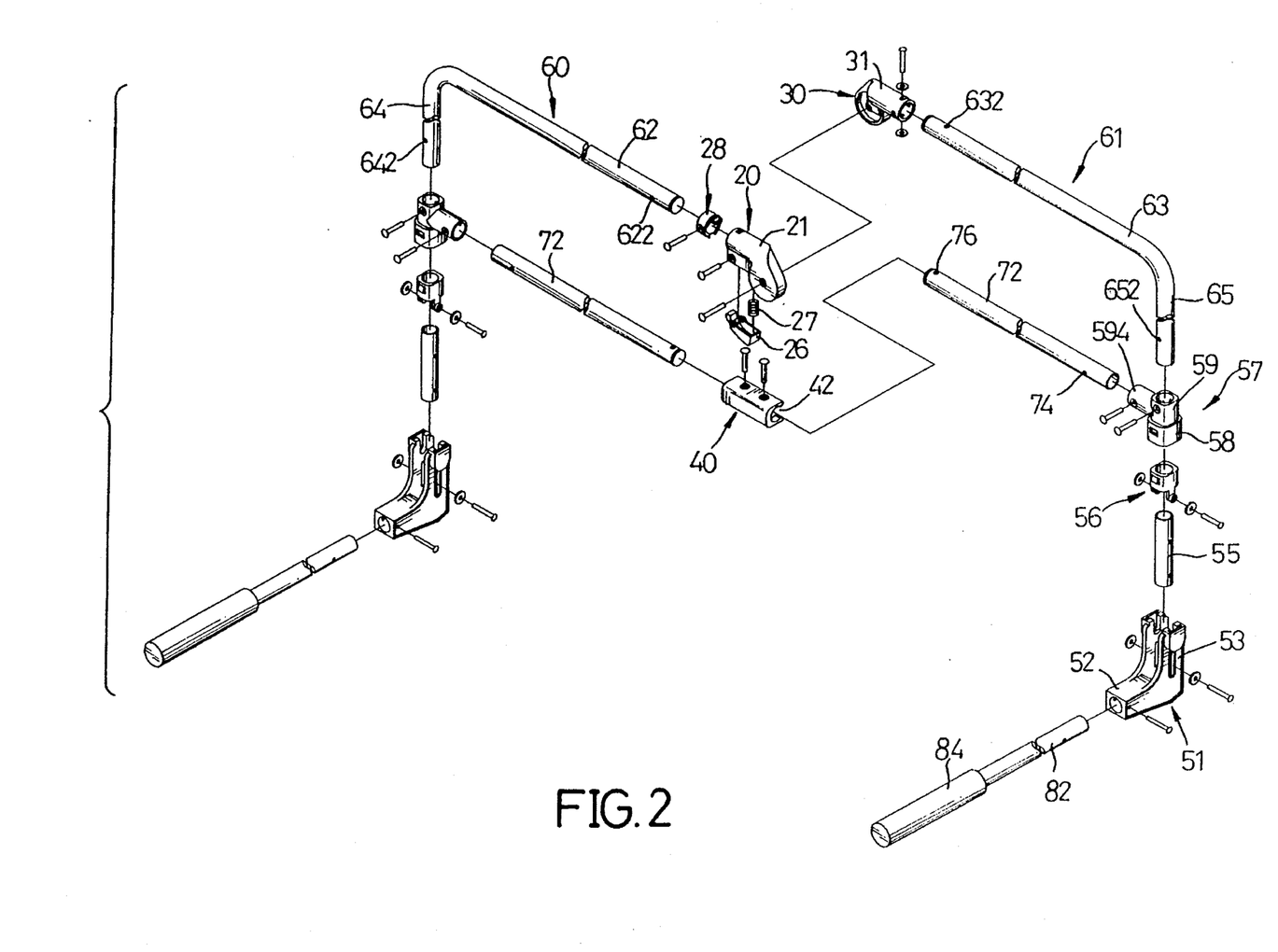
FIG. 2 is an exploded view of FIG. 1.

Referring to the drawings, and initially to FIGS. 1 and 2, a collapsible (or foldable) safeguard rail structure in accordance with the present invention comprises two L-shaped bases 51 each having a horizontal section 52 and a vertical section 53. Such a safeguard rail structure is usually mounted on a cot or playpen for protecting babies playing therein. Two horizontal supports 82 each have one distal end fixedly attached to the horizontal section 52 of a corresponding one of the two bases 51. Preferably, each of the two supports 82 has a buffer pad 84 mounted thereon for cushioning effects.

Two tubes 55 are each movably mounted on the vertical section 53 of a corresponding one of the two bases 51. Two catches 56 are each fixedly mounted on an upper portion of a corresponding one of the two tubes 55. Two fasteners 57 each include a lower portion 58 detachably mounted on a corresponding one of the two catches 56, an upper portion 59, and a horizontal portion 594 formed on the upper portion 59 thereof.

Two supporting braces 72 each have a first distal end fixedly attached to the horizontal portion 594 of a corresponding one of the two fasteners 57 and a second distal end. A pivot bracket 40 includes two distal ends each pivotally engaged with the second distal end of a corresponding one of the two supporting braces 72.

L-shaped first and second resting rails 60 and 61 each include a vertical section 64 and 65 fixedly mounted in the upper portion 59 of a corresponding one of the two fasteners 57, and a horizontal section 62 and 63.

A tubular block 28 is fixedly mounted around one distal end of the horizontal section 62 of the first resting rail 60 and a first transmission member 20 is rotatably mounted on the tubular block 28. A second transmission member 30 is rotatably mounted on one distal end of the horizontal section 63 of the second resting rail 61 and is pivotally engaged with the first transmission member 20.

Figure 3:
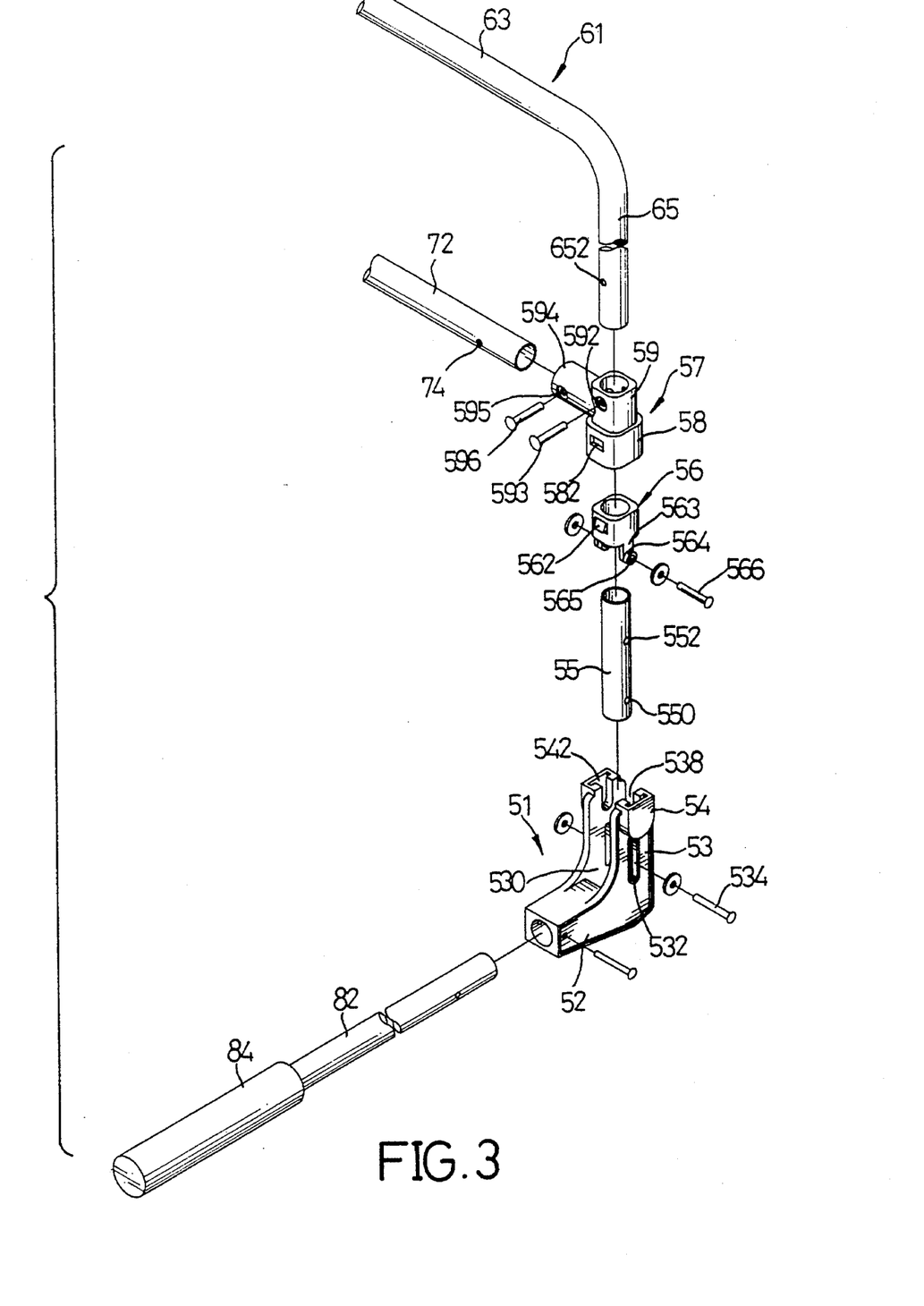
FIG. 3 is an partially enlarged view of FIG. 2;.
Figure 4:
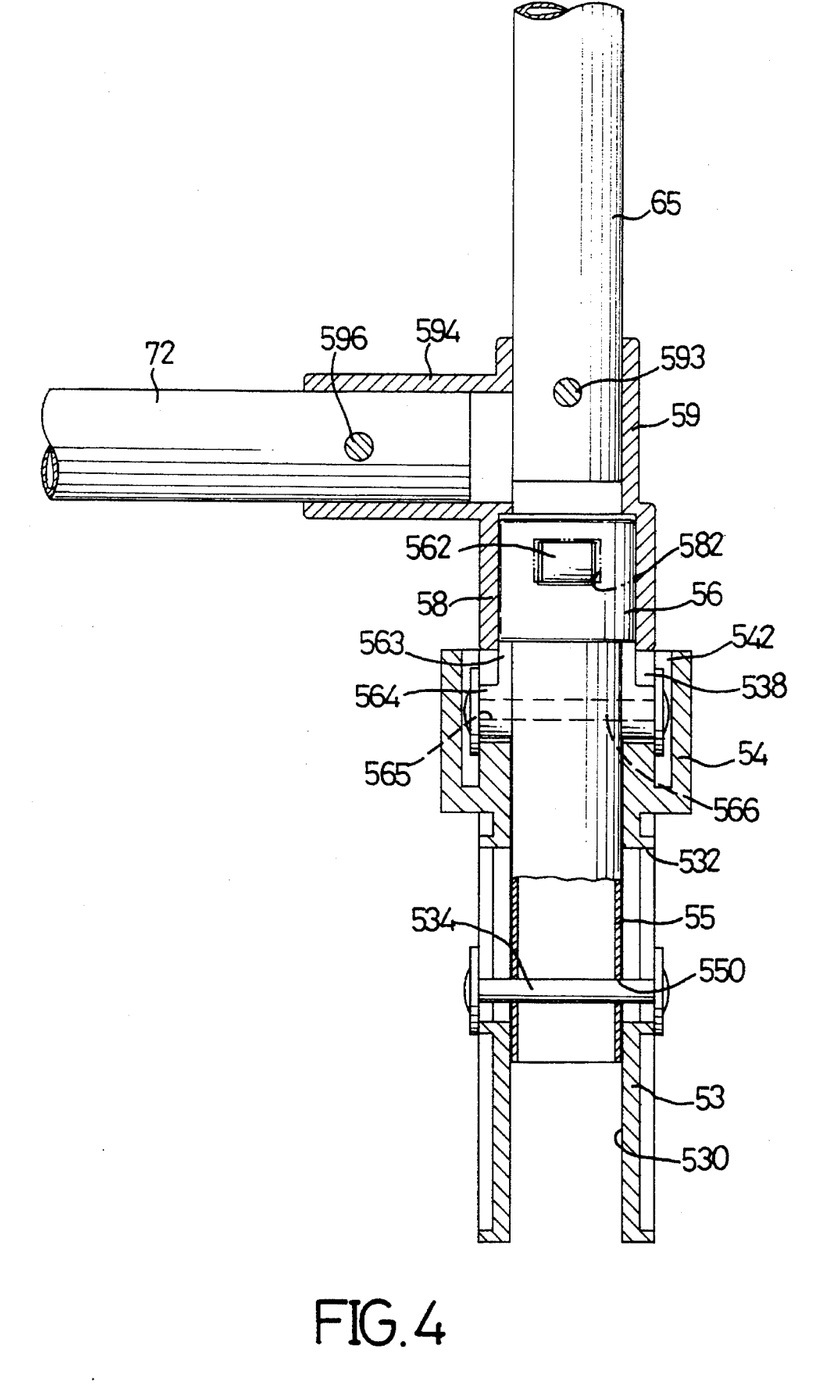
FIG. 4 is a front plan cross-sectional assembly view of FIG. 3.
Figure 5:
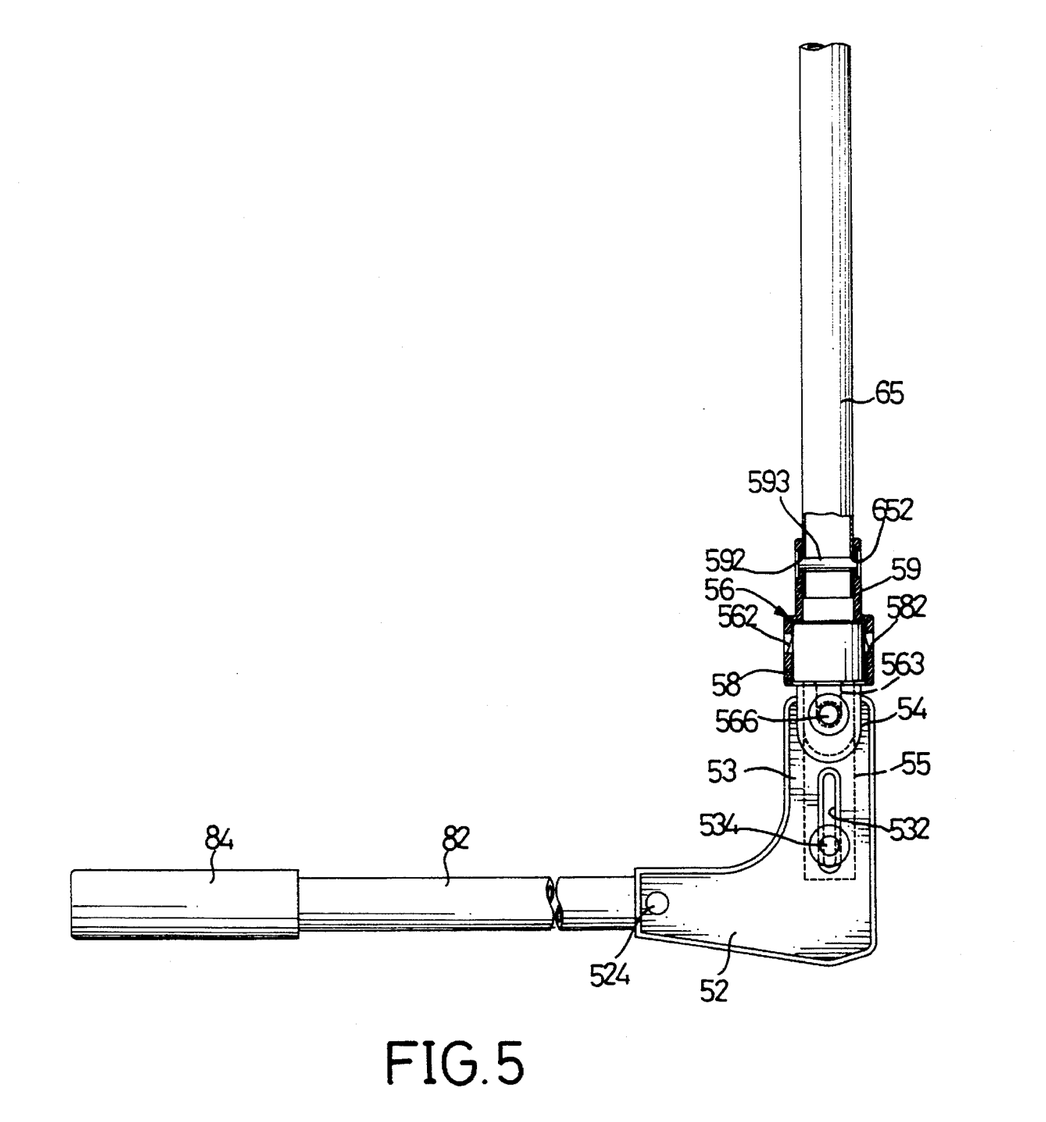
FIG. 5 is a side cross-sectional assembly view of FIG. 3.

Referring to FIGS. 3–5 with reference to FIGS. 1 and 2, the vertical section 53 of each of the two bases 51 includes two vertical walls (not labeled) with an opening 530 defined therebetween, and each of the two walls has an elongated slot 532 vertically defined therein. Each of the two tubes 55 is movably received in the opening 530 and has a through hole 550 transversely defined in a lower portion thereof and aligning with the elongated slots 532 of the associated base 51.

Two pins 534 each extend through the elongated slots 532 of a corresponding one of the two bases 51 and the through hole 550 of the associated tube 55 such that each of the two tubes 55 is movable in the opening 530 of the associated base 51.

Each of the side walls of the vertical section 53 of each of the two bases 51 has a guiding groove 538 defined in an upper portion thereof and includes a flange 54 laterally formed on the upper portion thereof and protruding outward therefrom. Each of the flanges 54 has a depression 542 defined therein and communicating with an associated guiding groove 538.

Each of the two catches 56 includes two legs 563 each mounted on the associated tube 55 and each having an ear 564 laterally formed thereon and protruding outward therefrom and detachably received in an associated guiding groove 538. Each of the two ears 564 has a bore 565 transversely defined therein and aligning with a hole 552 transversely defined through the associated tube 55. Two pins 566 each extend through the bores 565 of an associated catch 56 and through the hole 552 of an associated tube 55 and are each detachably received in the depressions 542 of an associated base 51.

Each of the two catches 56 includes a wedge 562 laterally and pressably mounted thereon, and each of the two fasteners 57 has a cavity 582 laterally defined in the lower portion 58 thereof for detachably receiving the wedge 562 of the associated catch 56 therein.

Two pins 593 each extend through bores 592 transversely defined in the upper portion 59 of each of the two fasteners 57 and through a hole 642 and 652 transversely defined in the vertical section 64 and 65 of each of the first and second resting rails 60 and 61.

Two pins 596 each extend through bores 595 transversely defined in the horizontal portion 594 of each of the two fasteners 57 and through a hole 74 transversely defined in the first distal end of each of the two supporting braces 72.

Figure 6:
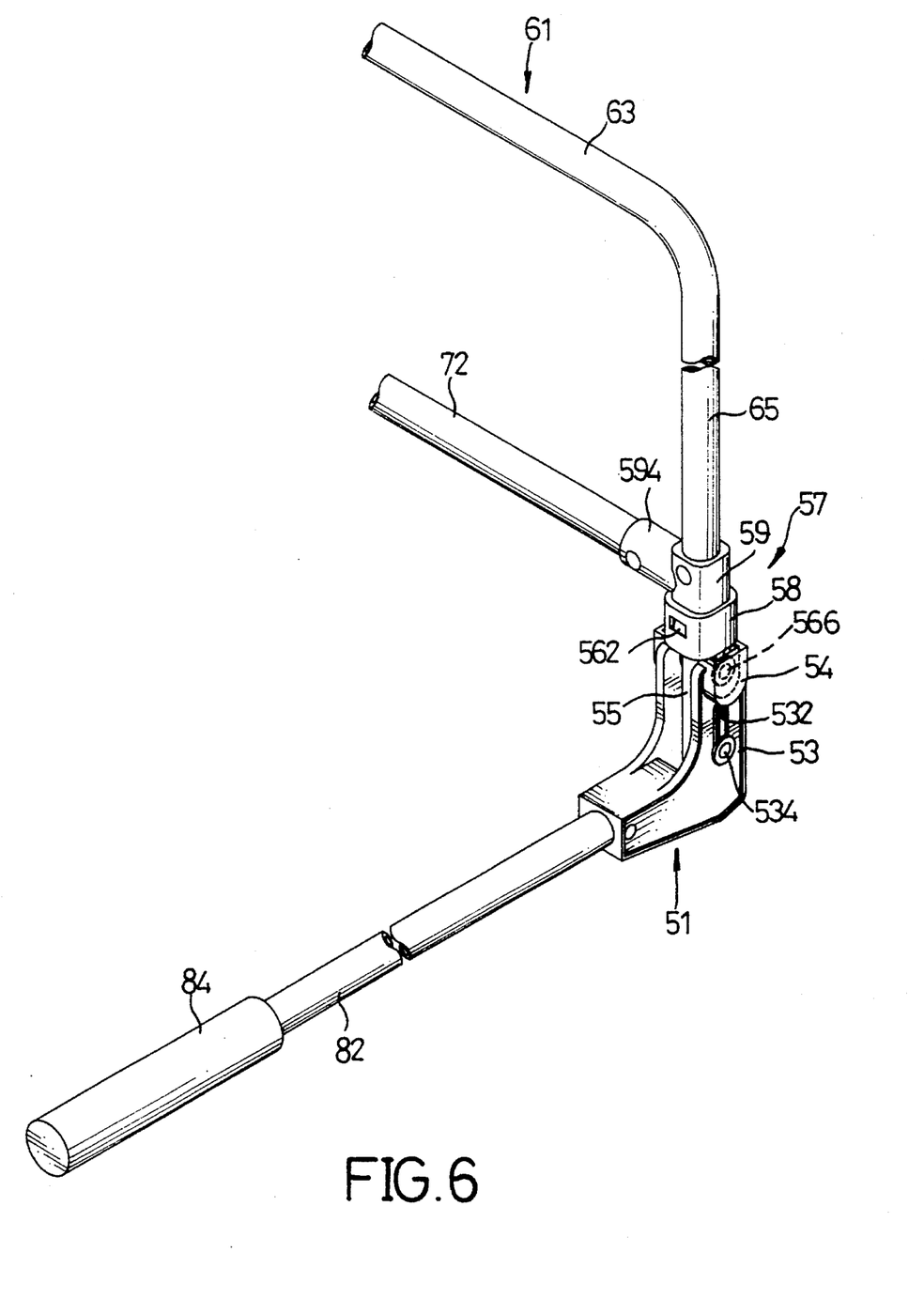
FIG. 6 is an assembly view of FIG. 3.
Figure 7:
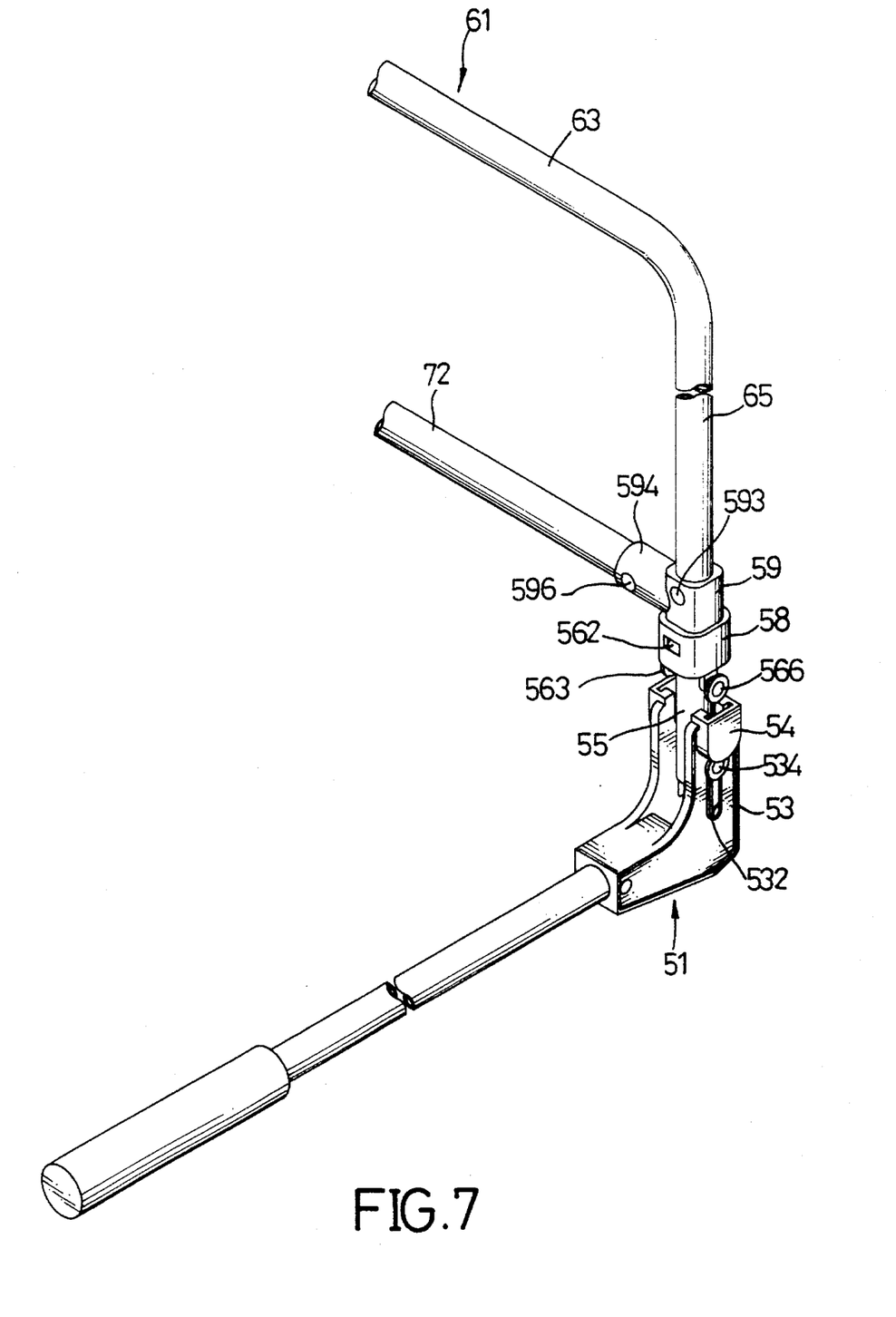
FIG. 7 is an operational view of FIG. 6.
Figure 8:
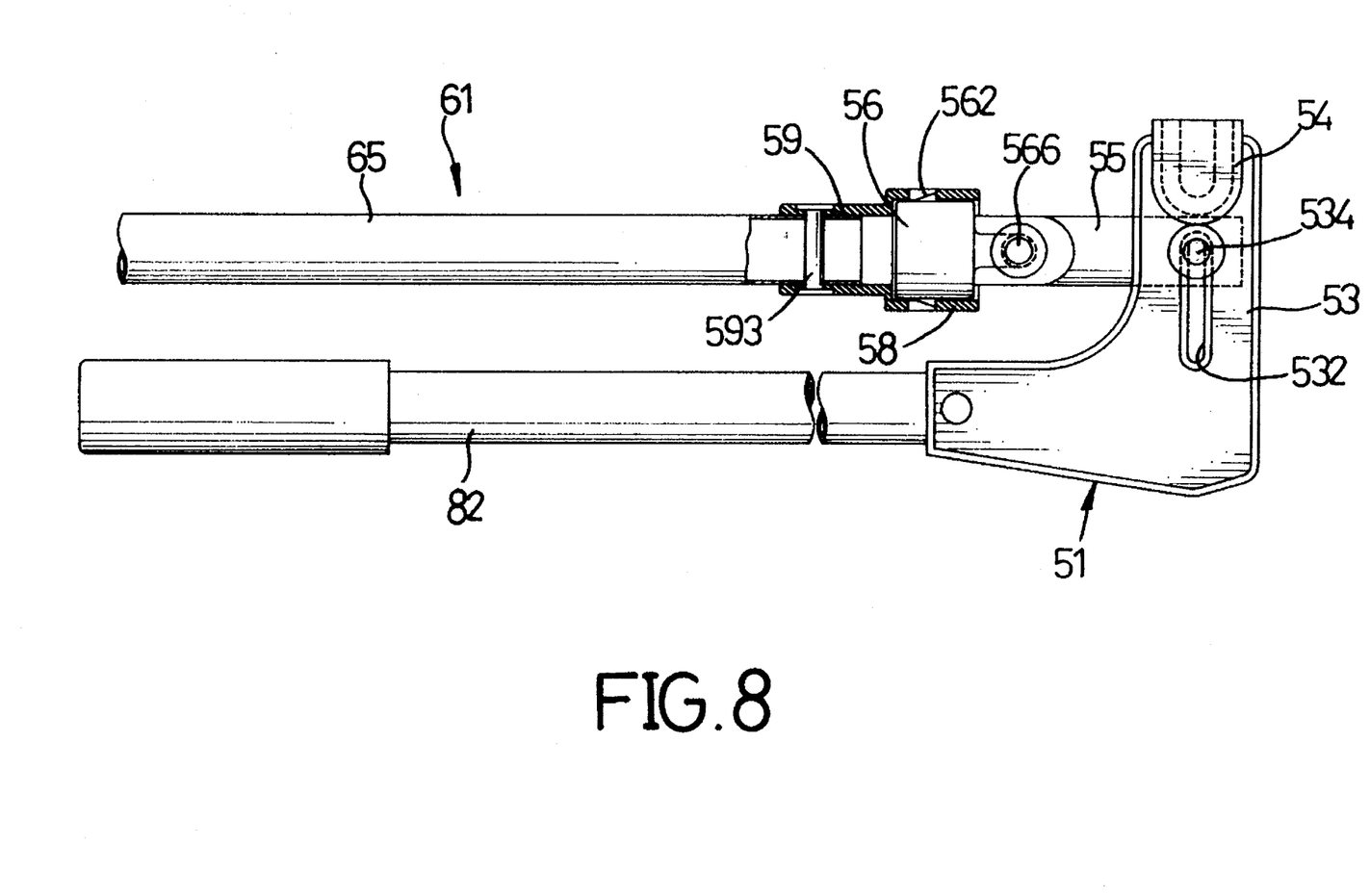
FIG. 8 is a folded view of FIG. 7.

In operation, referring to FIGS. 6–8 with reference to FIGS. 3–5, the lower portion 58 of each of the two fasteners 57 is initially rested on the vertical section 53 of the associated base 51 and the legs 563 of each of the two catches 56 together with the associated pin 566 are received in the guiding groove 538 and the depression 542 of the associated base 51 as shown in FIG. 6.

Each of the two tubes 55 can be moved upward to a position as shown in FIG. 7 such that the legs 563 of each of the two catches 56 together with the associated pin 566 are detached from the guiding groove 538 and the depression 542 of the associated base 51.

Then, each of the two tubes 55 can be pivoted relative the associated base 51 about the associated pin 534 as shown in FIG. 8, thereby folding the first and second resting rails 60 and 61 and the two supporting braces 72.

Figure 9:
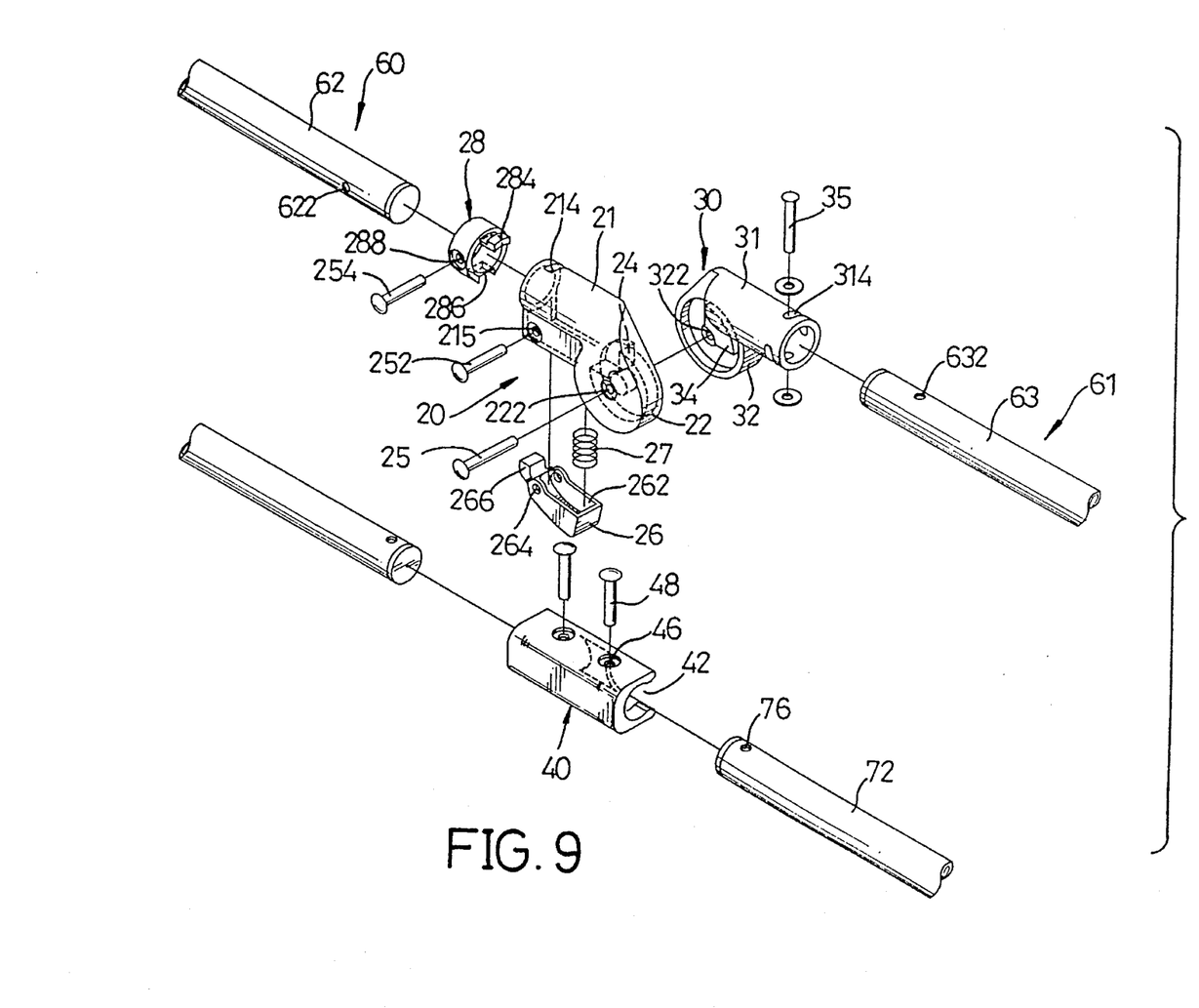
FIG. 9 is also an partially enlarged view of FIG. 2.

Referring to FIG. 9, the pivot bracket 40 includes a passage 42 transversely defined therein for receiving the second distal end of each of the two supporting braces 72 therein. Each of the two distal ends of the pivot bracket 40 has a bore 46 vertically defined therein and aligning with a through hole 76 vertically defined in the second distal end of each of the two supporting braces 72. Two pins 48 each extend through a corresponding one of the two bores 46 and an associated through hole 76.

Referring to FIGS. 9–12 with reference to FIGS. 1 and 2, a pin 254 extends through a bore 288 transversely defined in the tubular block 28 and through a hole 622 transversely defined in one distal end of the horizontal section 62 of the first resting rail 60, thereby fixing the tubular block 28 thereon.

The tubular block 28 includes a hook 284 laterally formed thereon and has a recess 286 defined in a periphery thereof.

The first transmission member 20 includes a body 21 mounted on the tubular block 28. An arcuate slot 214 is defined along a periphery of the body 21 for receiving the hook 284 therein such that the body 21 can be rotated relative to the tubular block 28.

A pivot member 26 is pivotally mounted on an underside of the body 21 and includes a detent 266 detachably received in the recess 286 of the tubular block 28 and has a chamber 262 defined therein. A spring 27 is mounted in the chamber 262 and biased between the pivot member 26 and the underside of the body 21. Preferably, a pin 252 extends through a hole 215 transversely defined in the body 21 and through bores 264 defined in the pivot member 26 such that the pivot member 26 can be pivoted about the pin 252.

The second transmission member 30 includes a body 31 mounted on the horizontal section 63 of the second resting rail 61. An arcuate slot 314 is defined along a periphery of the body 31 and aligns with a through hole 632 defined in the one distal end of the horizontal section 63 of the second resting rail 61. A pin 35 extends through the arcuate slot 314 and the through hole 632 such that the body 31 can be rotated relative to the second resting rail 61.

Circular extensions 22 and 32 are respectively formed on the underside of the bodies 21 and 31 and are coupled together by means of a pin 25 extending through a bore 222 transversely defined in the circular extension 22 and through a bore 322 transversely defined in the circular extension 32. Sectors 24 and 34 are respectively formed on and protrude outward from the circular extensions 22 and 32. Preferably, the two sectors 24 and 34 are located adjacent to each other and can be rotated relative to each other.

Figure 10:
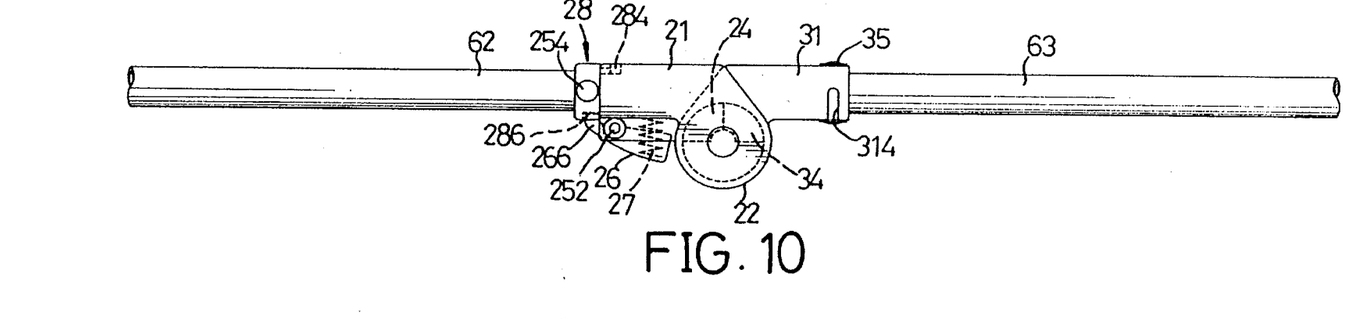
FIG. 10 is a front plan assembly view of FIG. 9.
Figure 11:
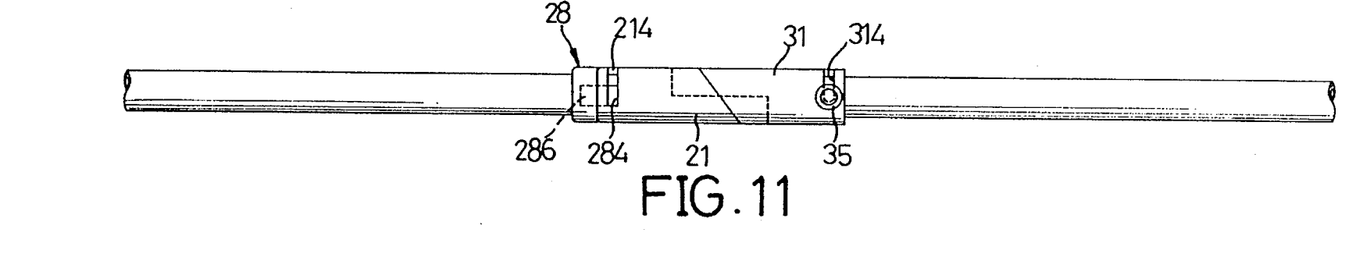
FIG. 11 is a top plan assembly view of FIG. 9.

The assembled situation of FIG. 9 is shown in FIG. 10 which is a partially top plan view thereof and in FIG. 11 which is a partially front plan view thereof.

Figure 12:
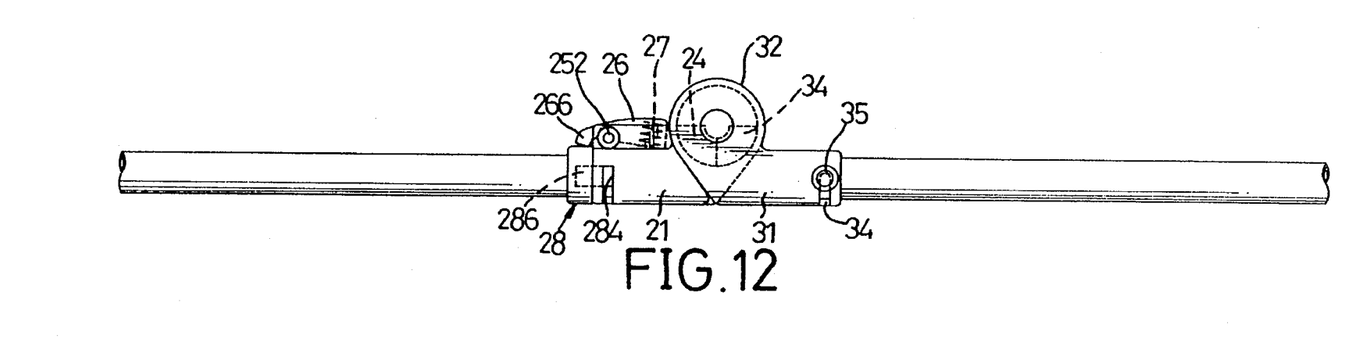
FIG. 12 is a top plan operational view of FIG. 9.
Figure 13:
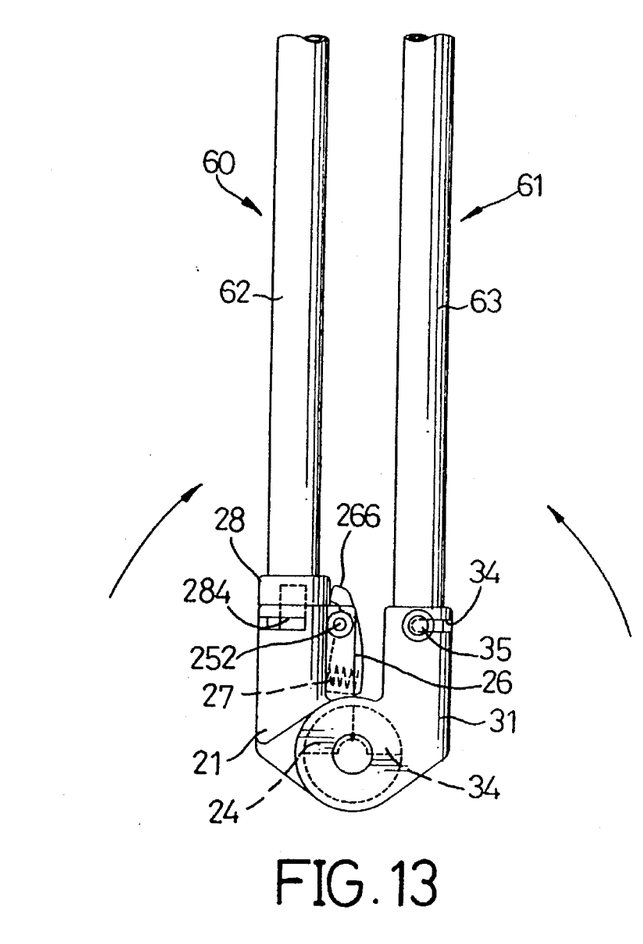
FIG. 13 is a further operational view of FIG. 12.

In operation, referring to FIGS. 12 and 13 with reference to FIGS. 9 and 10, the detent 266 of the pivot member 26 is initially disposed in the recess 286 of the tubular block 28 by means of an urging force exerted by the spring 27 such that the body 21 is secured on the tubular block 28 as shown in FIG. 10.

The pivot member 26 can be pivoted relative to the pin 252, thereby detaching the detent 266 from the recess 286 such that the body 21 can be rotated on the tubular block 28 and the body 31 can be rotated on the horizontal section 63 of the second resting rail 61 to a position as shown in FIG. 12 which is a partially top plan view of FIG. 9.

Figure 14:
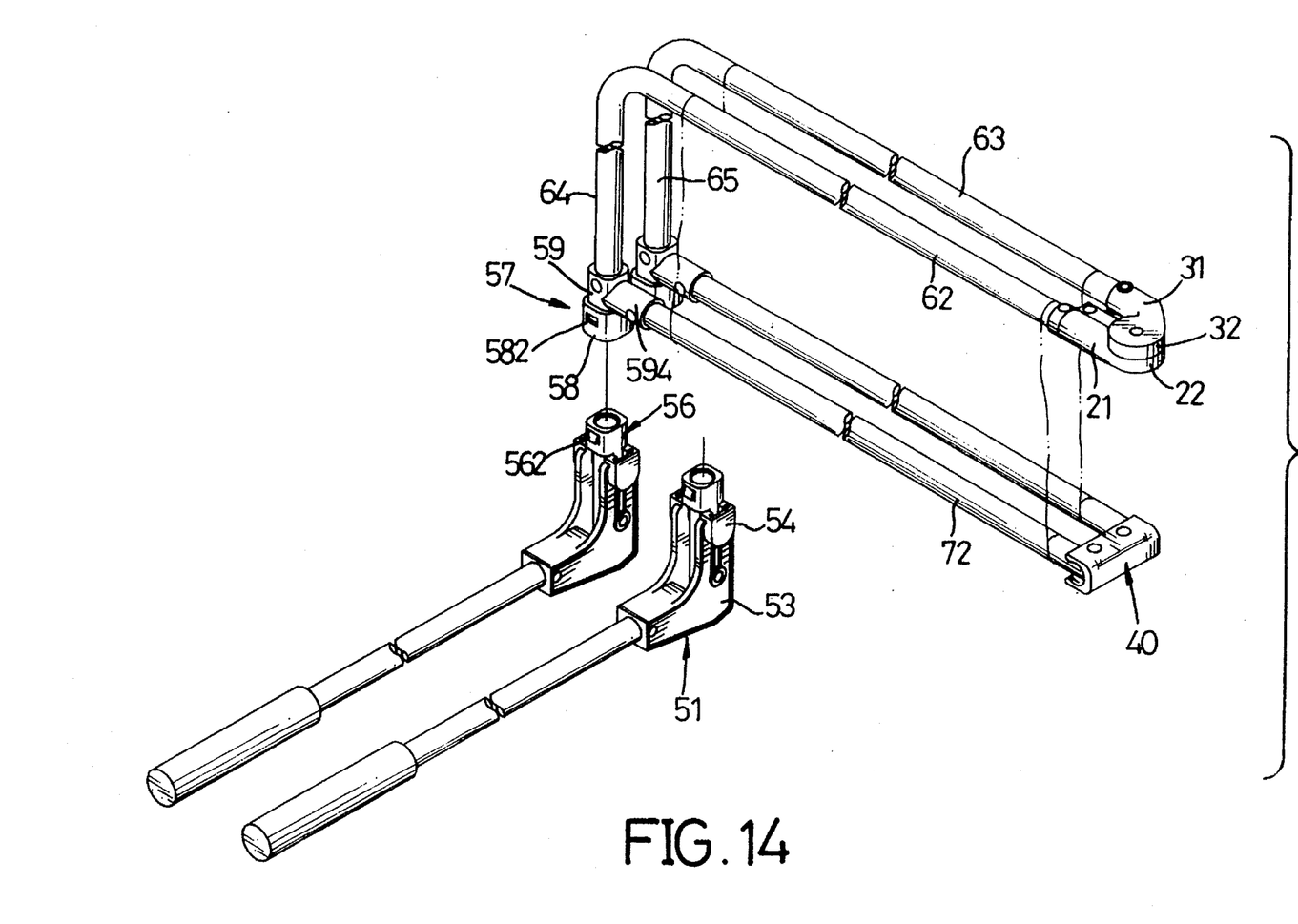
FIG. 14 is a folded and dismantled view of a safeguard rail structure in accordance with the present invention.

In such a situation, referring to FIGS. 12–14 with reference to FIG. 1, the two bodies 21 and 31 can be pivoted relative to each other such that the horizontal sections 62 and 63 of the two resting rails 60 and 61 can be pivoted relative to each other and the two supporting braces 72 can also be pivoted relative to each other, thereby folding the first and second resting rails 60 and 61 and the two supporting braces 72 as shown in FIGS. 13 and 14.

FIG. 14 shows a safeguard rail structure in accordance with the present invention disposed in a dismantled and folded status wherein each of the two wedges 562 is detached from the associated cavity 582 such that each of the two bases 51 together with the associated catch 56 is disengaged with the associated fastener 57.

By such an arrangement, a user can easily assemble or dismantle the safeguard rail structure by himself/herself. In addition, the rail structure will occupy very small space when being folded and dismantled.

It should be clear to those skilled in the art that further embodiments of the present invention may be made without departing from the spirit and scope of the present invention.

What is claimed is:

1. A rail structure comprising:
   two L-shaped bases (51) each having a horizontal section (52) and a vertical section (53);

two supports (82) each having one distal end fixedly attached to the horizontal section (52) of a corresponding one of said two bases (51);

two tubes (55) each movably mounted in the vertical section (53) of a corresponding one of said two bases (51);

two catches (56) each fixedly mounted on an upper portion of a corresponding one of said two tubes (55);

two fasteners (57) each including a lower portion (58) detachably mounted on a corresponding one of said two catches (56), an upper portion (59), and a horizontal portion (594) formed on said upper portion (59);

two supporting braces (72) each having a first distal end fixedly attached to the horizontal portion (594) of a corresponding one of said two fasteners (57) and a second distal end;

a pivot bracket (40) including two distal ends each pivotally engaged with the second distal end of a corresponding one of said two supporting braces (72);

L-shaped first and second resting rails (60) and (61) each including a vertical section (64) and (65) fixedly mounted in the upper portion (59) of a corresponding one of said two fasteners (57), and a horizontal section (62) and (63);

a tubular block (28) fixedly mounted around one distal end of the horizontal section (62) of said first resting rail (60);

a first transmission member (20) rotatably mounted on said tubular block (28); and a second transmission member (30) rotatably mounted on one distal end of the horizontal section (63) of said second resting rail (61) and pivotally engaged with said first transmission member (20).

2. The rail structure in accordance with claim 1, wherein the vertical section (53) of each of said two bases (51) has an elongated slot (532) vertically defined therein, each of said two tubes (55) having a through hole (550) transversely defined in a lower portion thereof and aligning with the elongated slot (532) of associated said base (51), two pins (534) each extending through said elongated slot (532) of a corresponding one of said two bases (51) and said through hole (550) of associated said tube (55).

3. The rail structure in accordance with claim 1, wherein each of said two catches (56) has a wedge (562) laterally mounted thereon, each of said two fasteners (57) having a cavity (582) laterally defined in the lower portion (58) thereof for detachably receiving said wedge (562) of associated said catch (56) therein.

4. The rail structure in accordance with claim 1, wherein said tubular block (28) has a hook (284) laterally formed thereon, said first transmission member (20) having a body (21) mounted on said tubular block (28), an arcuate slot (214) defined along a periphery of said body (21) for receiving said hook (284) therein.

5. The rail structure in accordance with claim 1, wherein said second transmission member (30) includes a body (31) mounted on the one distal end of the horizontal section (63) of said second resting rail (61), an arcuate slot (314) defined along a periphery of said body (31) and aligning with a through hole (632) defined in the one distal end of the horizontal section (63) of said second resting rail (61), a pin (35) extending through said arcuate slot (314) and said through hole (632).

6. The rail structure in accordance with claim 1, wherein said pivot bracket (40) includes a passage (42) transversely defined therein for receiving the second distal end of each of said two supporting braces (72) therein, each of the two distal ends of said pivot bracket (40) having a bore (46) vertically defined therein and aligning with a through hole (76) vertically defined in the second distal end of each of said two supporting braces (72), two pins (48) each extending through a corresponding one of said two bores (46) and associated said through hole (76).

* * * * *